UNITED STATES PATENT OFFICE.

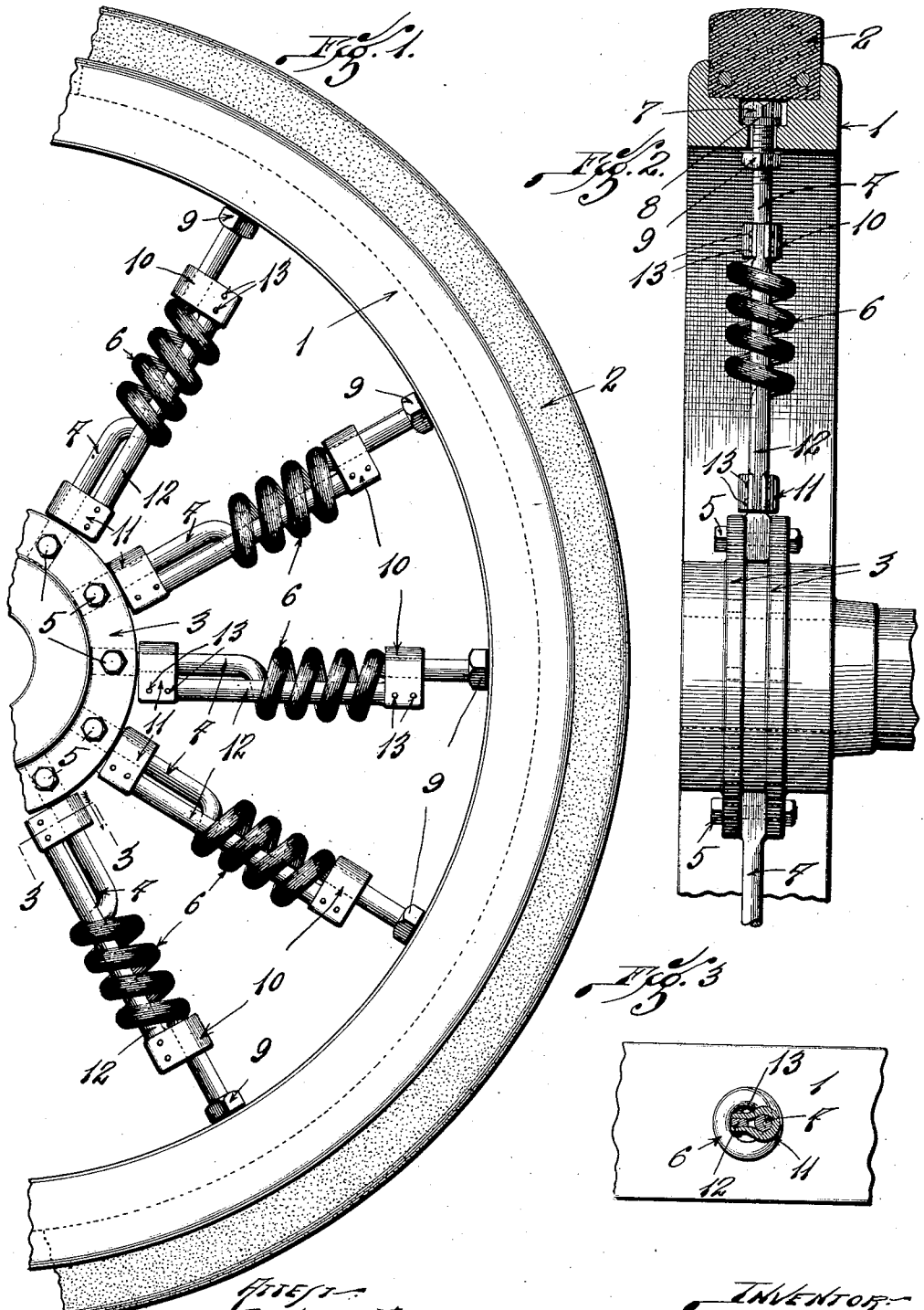

HERBERT H. PIPER, OF JACKSON, MISSOURI, ASSIGNOR OF ONE-HALF TO JOHN W. CRACRAFT, OF GORDONVILLE, MISSOURI.

AUTOMOBILE-WHEEL.

1,058,196.  Specification of Letters Patent.  Patented Apr. 8, 1913.

Application filed July 15, 1912. Serial No. 709,572.

*To all whom it may concern:*

Be it known that I, HERBERT H. PIPER, a citizen of the United States, and resident of Jackson, Missouri, have invented certain new and useful Improvements in Automobile-Wheels, of which the following is a specification containing a full, clear, and exact description, reference being had to the accompanying drawings, forming a part hereof.

My invention relates to an improved automobile wheel, and consists in the novel construction hereinafter described and designated in the appended claims.

The object of my invention is to provide an improved spring-spoke wheel especially adapted for use on automobiles, but of course it may be used on other vehicles, whereby the expensive pneumatic tires may be dispensed with and yet secure ample resiliency.

In the drawings: Figure 1 is a side elevation of a wheel embodying my invention, part being broken away to economize in drafting space; Fig. 2 is a vertical section of the wheel; and Fig. 3 is a detailed section taken on the line 3—3 of Fig. 1.

Referring by numerals to the drawings: 1 indicates the usual felly or rim, which may be of any common construction and upon which is mounted, in the present instance, a solid rubber tire 2.

3 indicates the usual hub flanges, between which the inner ends of the coil spring-spokes 4 are pivotally mounted by means of bolts 5. The spokes 4 are preferably made of steel rods having a coil 6 intermediate of their ends, and the outer ends of said spokes are secured to the rim 1 by means of nuts 7 threaded upon said ends. The washer 8 is located on said spokes between said nuts and said rim.

The outward thrust of the spokes is received by an enlargement or shoulder 9 located on said spokes and adapted to engage the rim. Said enlargement or shoulder may be, as shown, in the form of a nut threaded upon said spokes, for the purpose mentioned. To strengthen the spokes 4 and prevent lateral vibration thereof, I provide upon each spoke a sliding reinforcement, which preferably consists of a loop 10 embracing the spoke at a point intermediate of the coil 6 and the rim 1 and connected by a rod or bar 12 to an inner loop 11 of like construction, said inner loop embracing the spoke at a point intermediate of the said coil and the hub-flanges 3, and the said rod or bar 12 being arranged to slide within said coil parallel with the said spoke. The loops 10 and 11 are secured to the rod or bar 12 by means of pins or rivets 13.

All looseness and consequent rattling of the spoke reinforcing devices is prevented by making the loops 10 and 11 "hug" the spokes closely, so that the weight of the said reinforcing devices will be supported by frictional contact of said loops with the spokes, and yet permit the loops to slide upon said spokes whenever the latter are compressed or extended during use.

It will be seen that my improved wheel has a "floating" hub, so that the spokes beneath the hub will be compressed and those above the hub will be correspondingly extended when the wheel passes over an obstruction in the road, the said loops 10 and 11 sliding back and forth, as required, upon the spokes, and by reason of the frictional contact of said loops with said spokes acting as shock absorbers.

The additional functions of the wheel are apparent, and need not be described herein.

What I claim is:

1. The improved spring-spoke wheel, comprising a hub, a rim, spokes having a coil intermediate their ends, a loop embracing each spoke exterior of its coil, another loop embracing said spokes at a point near the hub, and a connection between said loops extending through said coils, to reinforce the latter.

2. The improved spring-spoke wheel, consisting of a hub; a rim; a series of spokes each having a coil intermediate of its ends and a straight portion at each end of the coil; a shock-absorbing loop embracing the straight portions of certain spokes to frictionally engage same at a point removed from said coils; and a connecting-device attached to said shock-absorbing loop and connecting it to a remote straight portion of the same spoke.

3. The improved spring-spoke wheel, consisting of a hub; a rim; a series of spokes each having a coil intermediate of its ends and a straight portion at each end of the coil; two shock-absorbing loops embracing the said straight portions of certain spokes to frictionally engage same at points removed from said coils; and a connecting device having its ends attached to the two shock-absorbing loops on said certain spokes.

In testimony whereof, I have signed my name to this specification, in presence of two subscribing witnesses.

HERBERT H. PIPER.

Witnesses:
E. L. WALLACE,
JOHN C. HIGDON.

Copies of this patent may be obtained for five cents each, by addressing the "Commissioner of Patents, Washington, D. C."